United States Patent
Wang et al.

(10) Patent No.: US 9,508,129 B1
(45) Date of Patent: Nov. 29, 2016

(54) DEHAZING PHOTOS AND VIDEOS USING VISUAL ARTIFACT SUPPRESSION

(71) Applicant: Adobe Systems Incorporated, San Jose, CA (US)

(72) Inventors: Jue Wang, Kenmore, WA (US); Chen Chen, Champaign, IL (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 0 days.

(21) Appl. No.: 14/935,299

(22) Filed: Nov. 6, 2015

(51) Int. Cl.
*G06T 5/00* (2006.01)

(52) U.S. Cl.
CPC ..... *G06T 5/002* (2013.01); *G06T 2207/10004* (2013.01); *G06T 2207/20192* (2013.01)

(58) Field of Classification Search
None
See application file for complete search history.

(56) References Cited

U.S. PATENT DOCUMENTS

2016/0005152 A1* 1/2016 Yang .......... G06K 9/40 382/275

OTHER PUBLICATIONS

Yishu Zhai and Dongjiang Ji "Single Image Dehazing for Visibility Improvement" International Archives of the Photogrammetry, Remote Sensing and Spatial Information Sciences, vol. XL-1/W4, 2015, pp. 355-360 Aug. 30, 2015.*
Li et al "A Contrast Enhancement Framework with JPEG Artifacts Suppression" Computer Vision—ECCV 2014.*
A. Beck and M. Teboulle. Fast gradient-based algorithms for constrained total variation image denoising and deblurring problems. IEEE Transactions on Image Processing, 18(11):2419-2434, 2009.
K. Bredies, K. Kunisch, and T. Pock. Total generalized variation. SIAM Journal on Imaging Sciences, 3(3):492-526, 2010.
A. Chambolle and T. Pock. A first-order primal-dual algorithm for convex problems with applications to imaging. Journal of Mathematical Imaging and Vision, 40(1):120-145, 2011.
R. Fattal. Single image dehazing. In ACM Transactions on Graphics (TOG), vol. 27, p. 72. ACM, 2008.
R. Fattal. Dehazing using color-lines. ACM Transactions on Graphics (TOG), 34(1):13,2014.
D. Ferstl, C. Reinbacher, R. Ranftl, M. Ruther, and H. Bischof. Image guided depth upsampling using anisotropic total generalized variation. In IEEE International Conference on Computer Vision (ICCV), pp. 993-1000. IEEE, 2013.
A. Galdran, J. Vazquez-Corral, D. Pardo, and M. Bertalmio. Enhanced variational image dehazing. SIAM Journal on Imaging Sciences, 2015.
K. He, J. Sun, and X. Tang. Single image haze removal using dark channel prior. IEEE Transactions on Pattern Analysis and Machine Intelligence, 33(12):2341-2353, 2011.
K. He, J. Sun, and X. Tang. Guided image filtering. IEEE Transactions on Pattern Analysis and Machine Intelligence, 35(6):1397-1409, 2013.

(Continued)

*Primary Examiner* — Sean Motsinger
(74) *Attorney, Agent, or Firm* — Keller Jolley Preece

(57) ABSTRACT

Methods and systems for dehazing images with increased accuracy and reduced error enhancement. In particular, one or more embodiments estimate a transmission map representing an amount of unscattered light reflected from objects in an input image. One or more embodiments refine the transmission map to obtain transmission information consistent with a depth of the objects in the input image. One or more embodiments also determine a radiance gradient for the input image. One or more embodiments generate an output image from the input image by removing haze based on the refined transmission map and preventing error enhancement based on the determined radiance gradient.

20 Claims, 10 Drawing Sheets

(56) References Cited

OTHER PUBLICATIONS

J. Kopf, B. Neubert, B. Chen, M. Cohen, D. Cohen-Or, O. Deussen, M. Uyttendaele, and D.Lischinski. Deep photo: Model-based photograph enhancement and viewing. In ACM, Transactions on Graphics (TOG), vol. 27, p. 116. ACM, 2008.

A. Levin, D. Lischinski, and Y. Weiss. A closed-form solution to natural image matting. IEEE Transactions on Pattern Analysis and Machine Intelligence, 30(2):228-242, 2008.

Y. Li, F. Guo, R. T. Tan, and M. S. Brown. A contrast enhancement framework with jpeg artifacts suppression. In European Conference on Computer Vision (ECCV), pp. 174-188. Springer, 2014.

Z. Li, P. Tan, R. T. Tan, D. Zou, S. Zhiying Zhou, and L.-F. Cheong. Simultaneous video defogging and stereo reconstruction. In IEEE Conference on Computer Vision and Pattern Recognition (CVPR), pp. 4988-4997, 2015.

S. Lu, X. Ren, and F. Liu. Depth enhancement via low-rank matrix completion. In Computer Vision and Pattern Recognition (CVPR), 2014 IEEE Conference on, pp. 3390-3397. IEEE, 2014.

G. Meng, Y. Wang, J. Duan, S. Xiang, and C. Pan. Efficient image dehazing with boundary constraint and contextual regularization. In IEEE International Conference on Computer Vision (ICCV), pp. 617-624. IEEE, 2013.

S. G. Narasimhan and S. K. Nayar. Contrast restoration of weather degraded images. IEEE Transactions on Pattern Analysis and Machine Intelligence, 25(6):713-724, 2003.

R. Ranftl, S. Gehrig, T. Pock, and H. Bischof. Pushing the limits of stereo using variational stereo estimation. In IEEE Intelligent Vehicles Symposium, pp. 401-407. IEEE, 2012.

D. Scharstein and R. Szeliski. A taxonomy and evaluation of dense two-frame stereo correspondence algorithms. International journal of computer vision, 47(1-3):7-42, 2002.

Y. Y. Schechner, S. G. Narasimhan, and S. K. Nayar. Instant dehazing of images using polarization. In IEEE Conference on Computer Vision and Pattern Recognition (CVPR), vol. 1, pp. 1-325. IEEE, 2001.

S. Shwartz, E. Namer, and Y. Y. Schechner. Blind haze separation. In IEEE Conference on Computer Vision and Pattern Recognition (CVPR), vol. 2, pp. 1984-1991, 2006.

R. T. Tan. Visibility in bad weather from a single image. In IEEE Conference on Computer Vision and Pattern Recognition (CVPR), pp. 1-8. IEEE, 2008.

K. Tang, J. Yang, and J. Wang. Investigating haze-relevant features in a learning framework for image dehazing in IEEE Conference on Computer Vision and Pattern Recognition (CVPR), pp. 2995-3002. IEEE, 2014.

J.-P. Tarel, N. Hauti' ere, L. Caraffa, A. Cord, H. Halmaoui, and D. Gruyer. Vision enhancement in homogeneous and heterogeneous fog. IEEE Intelligent Transportation Systems Magazine, 4(2):6-20, 2012.

M. Werlberger, W. Trobin, T. Pock, A. Wedel, D. Cremers, and H. Bischof. Anisotropic huber-11 optical flow. In British Machine Vision Conference (BMVC), vol. 1, p. 3, 2009.

* cited by examiner

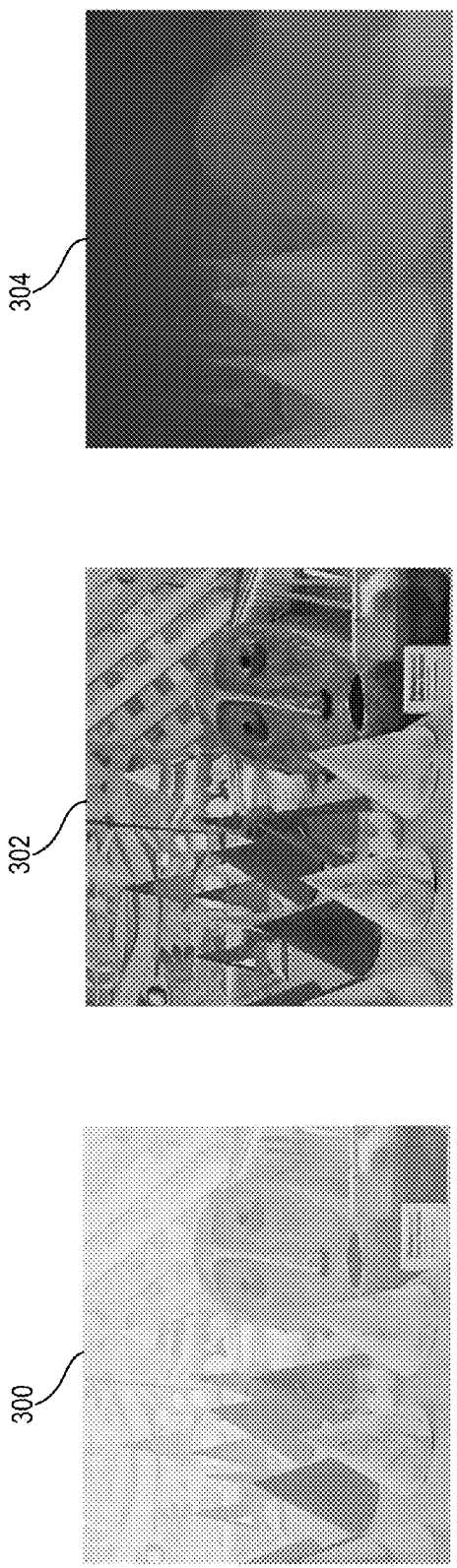
Fig. 3A — 300
Fig. 3B — 302
Fig. 3C — 304
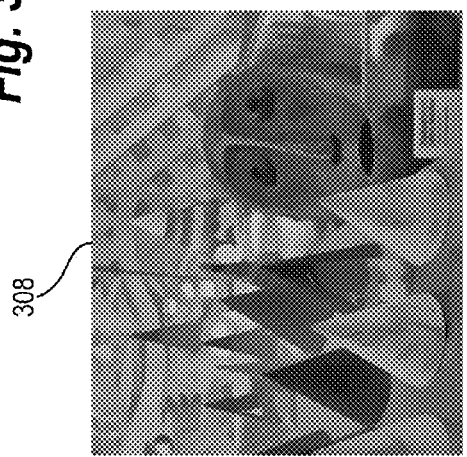
Fig. 3D — 306
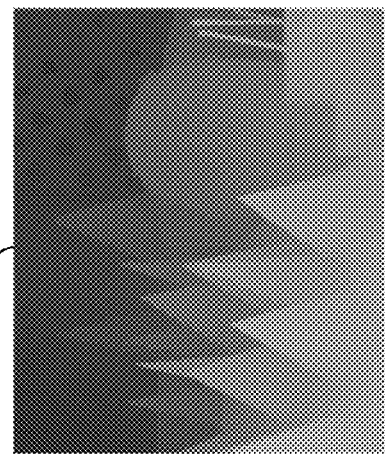
Fig. 3E — 308

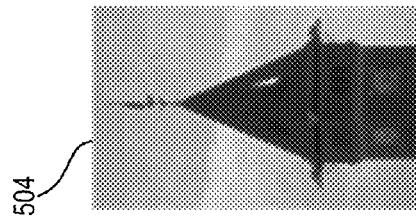
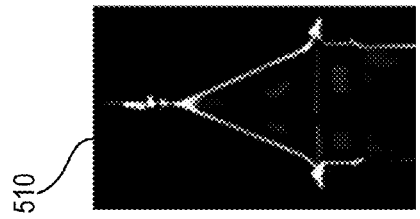
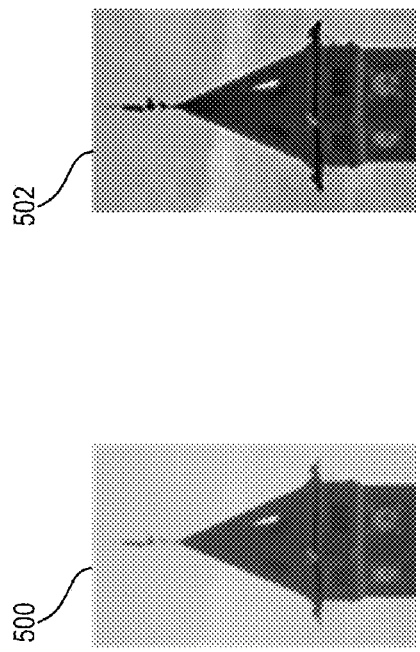
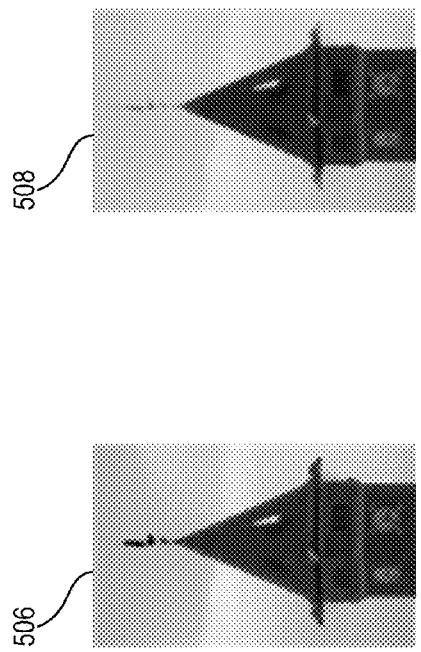

DEHAZING PHOTOS AND VIDEOS USING VISUAL ARTIFACT SUPPRESSION

BACKGROUND

1. Technical Field

One or more embodiments relate generally to systems and methods for image enhancement. More specifically, one or more embodiments of the present invention relate to systems and methods of modifying contrast in an image with visual artifact suppression.

2. Background and Relevant Art

Outdoor images and videos are often degraded by haze in the atmosphere. Due to atmospheric absorption and scattering, such images have lower contrast and visibility. In addition to the impact on visual quality, heavy haze can cause certain image processing tasks (e.g., stereo tracking and detection) during post-processing of an image to be more difficult than without the haze. Image processing typically involves modifying a contrast of an image to remove haze in the image prior to performing additional image processing tasks. Removing haze (or making any wide-scale adjustments to a contrast of an image), therefore, is often an important aspect of improving the efficiency and effectiveness of image post-processing operations, but is also a challenging and ill-posed problem.

Conventional contrast enhancement techniques generally perform poorly for dehazing images. Early techniques specific to dehazing an image focus on using multiple images for dehazing. Such early techniques use more than one image of the same scene (e.g., images with different degrees of polarization) to remove the haze. Although dehazing techniques that use multiple images can be useful when multiple images of the same scene are available in post processing, these techniques are not applicable when multiple images of the same scene are not available.

Other conventional contrast enhancement techniques rely on an assumption that input images have very high quality, as is the case of many natural hazy images. For low quality inputs that contain noise and artifacts, however, most existing methods will amplify the noise and artifacts (e.g., ringing, aliasing and blocky artifacts). For example, conventional single image dehazing techniques do not typically produce accurate results from low resolution or compressed images, such as images captured and processed by mobile devices or frames of highly compressed videos. In particular, while the conventional dehazing techniques may produce good results for high quality images, the same techniques often suffer from visual artifacts, including strong color shifting or amplification of existing artifacts for low quality input images.

To overcome the inaccuracies of conventional dehazing techniques in relation to low quality images, some conventional image processing techniques perform a pre-processing step to remove artifacts. Such artifacts are not easily removed from input images, however, and may remove image details that affect the dehazing process. On the other hand, attempting to remove enhanced or boosted artifacts produced by the dehazing process is often not effective unless the quality of the output image is sacrificed.

These and other disadvantages may exist with respect to conventional image dehazing techniques.

SUMMARY

Introduced here are techniques/technology for enhancing contrast in low-quality images with increased accuracy. For example, one or more embodiments estimate a transmission map for an input image to represent an amount of unscattered light reflected from objects in the input image. Additionally, one or more embodiments refine the transmission map so that transmission information in the transmission map is consistent with a depth of objects in the initial image. Furthermore, one or more embodiments enhance the contrast of the input image based on the refined transmission map to generate an output image. By producing a transmission map that is consistent or uniform at a given depth, one or more methods improve the effectiveness of contrast enhancement in the input image.

One or more embodiments also determine a radiance gradient of the input image. One or more embodiments use the determined radiance gradient of the input image to generate an output image with a radiance gradient consistent with the input image. Specifically, one or more embodiments change contrast levels in the input image based on the transmission map, and also prevent error enhancement in the output image using the radiance gradient of the input image. By using the radiance gradient of the initial image to generate the output image, the systems and methods can accurately change contrast levels in the image without emphasizing errors or artifacts from the initial image.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings:

FIGS. 3A-3E illustrate a series of images in a haze removal process in accordance with one or more embodiments;

FIGS. 4A-4E illustrate a series of test images for a plurality of haze removal methods in accordance with one or more embodiments;

FIGS. 5A-5F illustrate a series of test images for a plurality of haze removal methods in accordance with one or more embodiments;

DETAILED DESCRIPTION

Figure 1A:
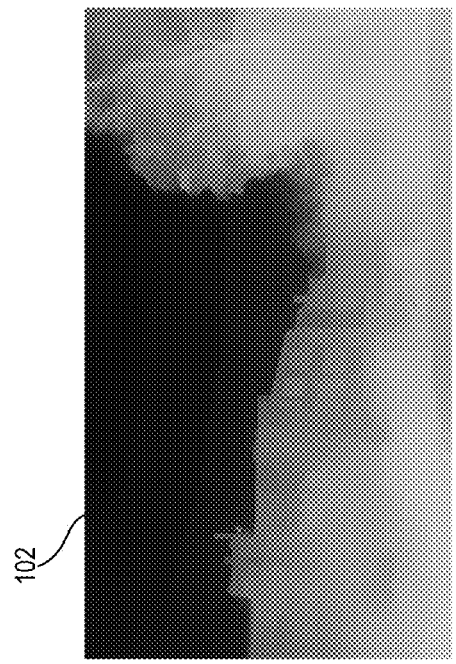
FIGS. 1A-1D illustrate a series of images in a haze removal process in accordance with one or more embodiments.

One or more embodiments of the present disclosure include an image processing system that enhances images with increased accuracy. In one or more embodiments, the image processing system modifies a contrast of an input image while preventing error enhancement in an output image. In particular, the image processing system dehazes a hazy input image by enhancing the contrast in the input image without also amplifying errors from the input image. For example, one or more embodiments of the image processing system modify a contrast of a low-quality image (e.g., lossy compressed image or video frame) to remove haze from the image without enhancing errors due to the compression or low quality of the image.

In one or more embodiments, the image processing system reduces errors in the output image by first generating a refined transmission map of the input image. Additionally, the image processing system reduces error enhancement from the dehazing process by suppressing edges due to artifacts when generating the output image. By generating the output image based on the refined transmission map and an edge suppression algorithm, the image processing system dehazes the input image and reduces or eliminates errors during the dehazing process. Specifically, the image processing system uses the refined transmission map with the edge suppression algorithm to remove the haze in a way that produces a haze-free output image having visible edges that are consistent with the input image.

In one or more embodiments, the image processing system generates a transmission map that is consistent with depths of surfaces and objects in the input image. In particular, textures and irregularities on the surfaces of objects in an image can appear in a transmission map for an image, which may introduce errors into the output image when modifying a contrast of the surfaces or objects. The image processing system suppresses visual artifacts due to dehazing by producing a refined transmission map having smooth transmission at a given depth. In other words, the refined transmission map ensures that objects, parts of objects, or surfaces at a given depth have a uniform transmission despite texture, surface irregularities, or other depth discontinuities.

According to one or more embodiments, the image processing system generates a refined transmission map by first obtaining an initial transmission map and then refining the initial transmission map. The image processing system can obtain the initial transmission map by assuming that transmission is constant within each image patch of a plurality of image patches. The image processing system then refines the initial transmission map using a depth edge-aware algorithm that takes into account object/surface boundaries while ignoring edges within objects/surfaces due to textures and color differences. The image processing system generates a transmission map without texture information (or with smoothed texture information) within surface and object boundaries in the input image. The refined transmission map thus provides an estimate of the depth of the surfaces and objects in the scene of the input image with smooth areas within the boundaries of the surfaces and objects.

After estimating the transmission map, one or more embodiments of the image processing system recover a latent image from the input image. Specifically, the image processing system reduces the haze in the input image and/or otherwise modifies the contrast of the image. Additionally, the image processing system suppresses artifacts from the original input image and from the dehazing process to prevent the artifacts from becoming more visible in the output image. For example, the image processing system constrains edges in the output image to be consistent with the edges in the input image.

In one or more embodiments, the image processing system determines a radiance gradient of the input image to use in generating the output image. The image processing system uses the radiance gradient from the input image to maintain substantially consistent edge information between the input image and the output image. In particular, the image processing system uses the radiance gradient from the input image to suppress edges and artifacts that may not be easily visible in the input image. By applying the radiance gradient of the input image when generating the output image, the image processing system penalizes and smoothes artifacts and even enhances edges at object boundaries.

As used herein, the term "transmission map" refers to an image or layer that represents an amount of unscattered light reflected from objects in an image. For example, light that reaches a camera device capturing an image of a scene without being scattered or absorbed by haze or other atmospheric particles form a transmission map. The image processing system can use the transmission map to perform post-processing operations to remove or reduce light scattered by haze or other atmospheric particles in an image.

As used herein, the term "refined transmission map" refers to an image or layer that represents a modified version of an original (or coarse) transmission map. For example, the refined transmission map can include a transmission map with smoothed surfaces for objects at the same depth in an image. Specifically, the image processing system can first capture a coarse transmission map representing the estimated light reflected from objects in an image. The image processing system then refines the coarse transmission map to generate the refined transmission map that is consistent or uniform at a given depth of the scene. To illustrate, the image processing system can generate a refined transmission map with smoothed texture information associated with surfaces and objects in the scene.

As used herein, the term "radiance gradient" refers to a gradient representing changes in reflected light in an image. Specifically, the radiance gradient represents differences in radiance between pixels or image patches in an image. The image processing system can use the radiance gradient from an input image to maintain shifts in radiance between pixels or image patches while modifying a contrast of the input image.

FIGS. 1A-1D illustrate a series of images in a haze removal process, including an input image, a transmission map, an artifact layer, and an output image for the haze removal process. An overview of the process of dehazing process is described in relation to FIGS. 1A-1D. Greater details of the dehazing process are then described in relation to the remaining Figures.

FIG. 1A illustrates an input image 100 (from a video frame) for a particular scene with poor lighting, visibility, and contrast due to hazy atmosphere in the scene. The image processing system can apply the haze removal process to modify the lighting and contrast of the input image 100 to make certain aspects of the input image 100 more distinguishable (e.g., to distinguish buildings, plants, or other foreground objects from a background). The dehazing process can enhance detail in an image to allow certain features that were obscured by the haze to become more visible and vivid, improving the overall image quality.

In one or more embodiments, the image processing system processes digital images of various qualities or resolutions. For example, the digital images can include images with compression and/or low resolution. To illustrate, the digital images can include compressed images (e.g., JPEGs or compressed video frames) or low quality images (e.g., images from a low quality digital camera). In at least some instances, the image processing system processes images with high resolution and/or no compression. Additionally, or alternatively, in at least some examples, the image processing system or another system can convert an input image to a digital image from a photograph (i.e., by scanning the image) before dehazing the input image.

According to one or more embodiments, the image processing system uses a physical haze model to recover a latent, haze-free image from the input image 100. More particularly, the image processing system estimates a transmission map of the input image. As previously mentioned, the transmission describes the portion of light that reaches the camera that captured the scene without being scattered or absorbed.

In order to estimate the atmosphere transmission map, the image processing system first estimates a coarse transmission map based on local image priors. For example, the local image priors can include a dark channel prior. The dark channel prior is based on an observation that local patches in haze-free outdoor images contain pixels that have very low intensities in at least one color channel. The image processing system can use the dark channel prior to obtain a transmission map for recovering the latent, haze-free image from the input image 100 by removing the haze component in each pixel's color.

After estimating the coarse transmission map, the image processing system can obtain a refined transmission map to use in removing the haze from the input image 100. Textures on surfaces or objects can cause the coarse transmission map to include different transmission values at similar depths on objects with varying textures (including different colors). Different transmission values at similar depths can result in inaccurate haze removal or introduce artifacts across a surface or object. Thus, refining the transmission map to smooth or soften the texture information in the transmission map improves the accuracy of haze removal and reduces the number of artifacts in the resulting output image.

According to one or more embodiments, the image processing system refines the coarse transmission map by removing some or all texture information from the coarse transmission map. Specifically, the image processing system uses a depth edge-aware algorithm to determine an approximate depth of surfaces and objects in the scene of the input image 100 based on the coarse transmission map. For example, the image processing system maintains information about the edges of different surfaces and objects while also smoothing areas within the surfaces and objects. The result of the algorithm can approximate a depth map of the scene without having the actual three-dimensional layout of the scene.

Figure 1B:

As mentioned, the image processing system uses the coarse transmission map from the dark channel priors to generate the refined transmission map. FIG. 1B illustrates a refined transmission map 102 for the input image 100 of FIG. 1A. As illustrated, the refined transmission map 102 includes transmission information that approximately corresponds to the depth (or three-dimensional layout) of the surfaces and objects within the scene of the input image 100. Additionally, the refined transmission map 102 can exclude texture information associated with each of the surfaces and objects.

Figure 1C:

After generating the refined transmission map 102, the image processing system uses the refined transmission map 102 to remove or reduce the haze in the scene of the input image 100. Additionally, the image processing system reduces or eliminates error amplifying during the dehazing process. For example, the image processing system assumes that the dehazing process produces noise and errors when attempting to recover the scene radiance from the input image. The image processing system removes the noise and errors produced during the dehazing processing. FIG. 1C illustrates an amplified artifact layer 104 corresponding to the error that the image processing system removes from the input image 100 of FIG. 1A.

As illustrated, the amplified artifacts in the amplified artifact layer 104 in FIG. 1C correspond to edges or other artifacts that are typically not visible or are barely visible in the input image 100. Thus, the image processing system can use prior information from the input image 100 for informed artifact suppression. Specifically, the image processing system can constrain edges in the output image to be consistent with the edges in the input image 100 so that only edges that were already visible in the input image 100 are visible in the output image. New edges that do not exist in the input image 100 are penalized, while original edges in the input image 100 are not penalized, and are potentially even boosted in the output image.

In one or more embodiments, ensures that the radiance gradient of the output image is consistent with the radiance gradient of the input image 100. Specifically, the image processing system can ensure that the radiance of the output image does not include enhanced artifacts that only existed in the input image 100 due to compression edges or other artifacts in the input image 100. For example, the image processing system can verify that a change in radiance between pixels or image patches in the output image is consistent with a change in radiance between pixels in corresponding pixels or image patches in the input image 100.

Providing a consistent radiance gradient between the input image 100 and the output image can ensure that edges that are plainly visible in the input image 100 (e.g., object edges) are plainly visible (or even enhanced) in the output image. Additionally, the image processing system can provide the consistent radiance to ensure that artifacts that are not plainly visible (e.g., edges due to compression or low image quality) do not become plainly visible in the output image after modifying the contrast of the image. Thus, the image processing system can prevent error enhancement in the output image while dehazing the input image 100 and even enhance certain details and features of the input image 100 for a better, clearer picture.

In one or more embodiments, the image processing system constrains edges in the output image to be consistent with edges in the input image 100. Specifically, the image processing system can use a determined threshold to determine whether to suppress an edge from the input image 100. For example, the image processing system compares the edge to a gradient threshold to determine whether a radiance gradient associated with the edge meets the gradient threshold. If the radiance gradient associated with the edge meets the gradient threshold, the image processing system maintains the edge in the output image. If the radiance gradient associated with the edge does not meet the gradient threshold, the image processing system suppresses the edge in the output image.

Figure 1D:

Thus, as described above, the image processing system generates an overall high quality transmission map. Visual elements of an input image can break the piecewise smooth assumption upon which the transmission map was generated. As a result, the refined transmission map may be oversmoothed in some regions. The image processing system can dehaze the input image while correcting the oversmoothing errors and also reducing or eliminating the error produced during the dehazing processing, producing a near artifact-free output image. FIG. 1D illustrates an output image 106 based on the transmission map of FIG. 1B and without the unamplified artifact layer associated with the amplified artifact layer 104 of FIG. 1C. As shown by a comparison of FIG. 1A and FIG. 1D, the output image 106 is dehazed and lacks significant or all artifact amplification.

As mentioned previously, the image processing system uses a physical haze model to recover a latent, haze-free image from the input image 200. In one example, the haze model is represented as:

$$I(x)=J(x)t(x)+A(1-t(x)),$$

where I is the hazy input image, J is the scene radiance, A is the atmospheric light and is assumed to be constant over the whole image, t is the medium transmission and x represents image coordinates. The image processing system estimates J, A, and t from the input image I.

In order to estimate the atmosphere transmission map, the image processing system first estimates a coarse transmission map based on local image priors. For example, the local image priors can include a dark channel prior. The dark channel prior is based on an observation that local patches in haze-free outdoor images contain pixels that have very low intensities in at least one color channel. The image processing system can use the dark channel prior to obtain a transmission map for recovering the latent, haze-free image from the input image 200 by removing the haze component in each pixel's color, as described in more detail below.

In one example, the dark channel prior is defined as:

$$J^{dark}(x) = \min_{y \in \Omega(x)} \left( \min_{c \in \{r,g,b\}} J^c(y) \right),$$

where c denotes the color channel and $\Omega(x)$ is a local patch around x. Haze free images often contain shadows and/or colorful or dark objects/surfaces, which often makes the dark channel zero, allowing the dark channel prior to be represented as:

$$\frac{I^c(x)}{A^c} = \frac{J(x)}{A^c} t(x) + 1 - t(x).$$

Taking minimum operations on both sides of the above equation results in:

$$\min_{y \in \Omega(x)} \left( \min_c \frac{I^c(y)}{A^c} \right) = \min_{y \in \Omega(x)} \left( \min_c \frac{J(y)}{A^c} t(x) \right) + 1 - t(x).$$

Additionally, assuming that the transmission is constant in each local image patch eliminates the dark channel to obtain the coarse transmission map:

$$\tilde{t}(x) = 1 - \min_{y \in \Omega(x)} \left( \min_{c \in \{r,g,b\}} \frac{I^c(x)}{A^c} \right),$$

where the brightest pixel in the dark channel allows the image processing system to estimate the atmospheric light A.

After estimating the coarse transmission map, the image processing system can obtain a refined transmission map to use in removing the haze from the input image 200. Textures on surfaces or objects can cause the coarse transmission map to include different transmission values at similar depths on objects with varying textures (including different colors). Different transmission values at similar depths can result in inaccurate haze removal or introduce artifacts across a surface or object. Thus, refining the transmission map to smooth or soften the texture information in the transmission map can improve the accuracy of haze removal and reduce the number of artifacts in the resulting output image.

According to one or more embodiments, the image processing system refines the coarse transmission map by removing some or all texture information from the coarse transmission map. Specifically, the image processing system uses a depth edge-aware algorithm to determine an approximate depth of surfaces and objects in the scene of the input image 200 based on the coarse transmission map. For example, the image processing system maintains information about the edges of different surfaces and objects while also smoothing areas within the surfaces and objects. The result of the algorithm can approximate a depth map of the scene without having the actual three-dimensional layout of the scene.

As mentioned, the image processing system uses the coarse transmission map from the dark channel priors to generate the refined transmission map. In one or more embodiments, the system formulates transmission refinement as an optimization problem with a data fidelity term and regularization terms. Specifically, instead of an $l_2$ norm data term, the system uses an $l_1$ norm data term to tolerate outliers and errors. Additionally, the system adopts a second order Total Generalized Variation algorithm with a guided image for regularization, which limits undesired staircasing artifacts and produces piecewise smooth images. For example, the algorithm can be represented as:

$$\min_{t,w} \left\{ \alpha_1 \int |D^{1/2}(\nabla t - w)| dx + \alpha_0 \int |\nabla w| dx + \int |t - \tilde{t}| dx \right\},$$

where $D^{1/2}$ is the anisotropic diffusion tensor defined as:

$$D^{1/2} = \exp(-\gamma |\nabla I|^\beta) nn^T + n^\perp n^{\perp T},$$

where n is the direction of the image gradient $$n = \frac{\nabla I}{|\nabla I|}$$

and $n^\perp$ is the perpendicular direction, $\gamma$, $\beta$ are parameters to adjust the sharpness and magnitude of the tensor.

In one or more additional embodiments, by applying a prime-dual minimization algorithm with the Legendre Fenchel transform. The transformed prim-dual algorithm is given by:

$$\min_{t,w} \min_{p \in P, q \in Q} \alpha_1 \langle D^{1/2}(\nabla t - w), p \rangle + \alpha_0 \langle \nabla w, q \rangle + \int |t - \tilde{t}| dx,$$

where p, q are dual variables and their feasible sets are:

$$P = \{p \in R^{2MN}, \|p\|_\infty \leq 1\},$$

$$Q = \{q \in R^{4MN}, \|q\|_\infty \leq 1\}.$$

A summarized version of the algorithm for refining the transmission map is represented in Algorithm 1 below.

Algorithm 1: Guided TGV refinement

Initialization: $t^0=\tilde{t}$, $w^0$, $p_0$, $q_0=0$, $\sigma_p>0$, $\sigma_q>0$, $\tau_t>0$, $\tau_w>0$
for k=0 to Maxiteration do $$p^{k+1}=P[p^k+\sigma_p\alpha_1(D^{1/2}(\nabla t^{-k}-w^{-k}))]$$

$$q^{k+1}=P[q^k+\sigma_p\alpha_0\nabla w^{-k}]$$

$$t^{k+1}=\text{thresholding}_\tau(t^k+\tau_u\alpha_1\nabla^T D^{1/2}p^{k+1})$$

$$w^{k+1}=w^k+\tau_w(\alpha_0\nabla^T q^{k+1}+\alpha_1 D^{1/2}p_{k+1})$$

$$t^{-k+1}=t^{k+1}+\theta(t^{k+1}-t_{-k})$$

$$w^{-k+1}=w^{k+1}+\theta(w^{k+1}-w^{-k})$$

end for

In Algorithm 1, $\sigma_p>0$, $\sigma_q>0$, $\tau_t>0$, $\tau_w>0$ are step sizes and k is the iteration counter. The element-wise projection operators P is defined:

$$P[x] = \frac{x}{\max\{1,|x|\}}.$$

The thresholding$_\tau$( ) element in Algorithm 1 denotes a soft-thresholding operation:

$$\text{thresholding}_\tau(x)=\max(|x|-\tau 0)\text{sign}(x).$$

Figure 2B:
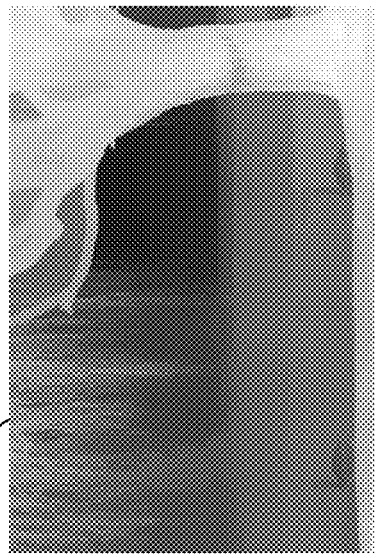
FIGS. 2A-2D illustrate a series of images in a haze removal process in accordance with one or more embodiments.

The image processing system updates θ in every iteration and approximates the divergence and gradient operators using standard finite differences. After applying Algorithm 1 to the input image 200, the image processing system produces the refined transmission map 202 of FIG. 2B. As described, the image processing system assumes a piecewise smooth assumption using Algorithm 1. As illustrated, however, the willow branches in the left upper region of the input image break the piecewise smooth assumption, resulting in a refined transmission map 202 that is oversmoothed in the upper left region of the scene.

After generating the refined transmission map 202, the image processing system uses the refined transmission map 202 to remove or reduce the haze in the scene of the input image 200. Additionally, the image processing system can reduce or eliminate error enhancement during the dehazing process. For example, the image processing system can assume that the dehazing process produces noise and errors when attempting to recover the scene radiance from the input image. The image processing system removes the noise and errors produced during the dehazing processing.

Figure 2D:
Figure 2A:
Figure 2C:
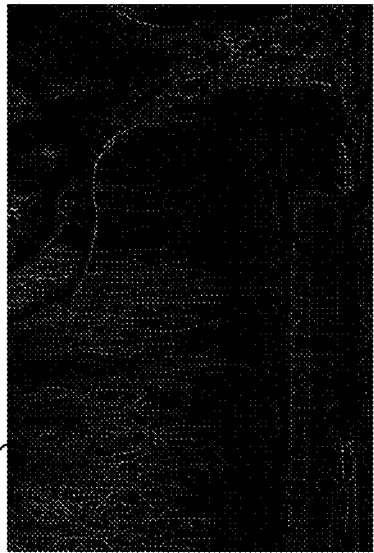

After the transmission is estimated, our next goal is to recover the true scene radiance J. By adding an error term E to a least squares fitting of the dehazing algorithm and assuming the error term to be sparse, the dehazing algorithm can be represented as:

$$\min_{J,E}\left\{\frac{1}{2}\int\|Jt-(I-E-A+At)\|_2^2 dx + \lambda\int\|E\|_0 dx\right\},$$

where the $l_0$ norm counts the number of non-zero elements and λ is a regularization parameter. FIG. 2C illustrates an amplified artifact layer 204 corresponding to the error term that the image processing system removes from the input image 200 of FIG. 2A. FIG. 2C illustrates the artifact layer 204 (amplified ×10) that the image processing system has separated from the input image 200 to prevent the image processing system from amplifying the errors in the output image. The artifact layer 204 includes aliasing artifacts around edges of objects in the scene, such as around the trunk of the willow tree.

As illustrated, the amplified artifacts in the amplified artifact layer 204 in FIG. 2C correspond to edges or other artifacts that are typically not visible or are barely visible in the input image 200. Thus, the image processing system can use prior information from the input image 200 for informed artifact suppression. Specifically, the image processing system can constrain edges in the output image to be consistent with the edges in the input image 200 so that only edges that were already visible in the input image 200 are visible in the output image.

Because the edges are assumed to be sparse, the dehazing problem can be represented as:

$$\min_{J,E}\left\{\frac{1}{2}\int\|Jt-(I-E-A+At)\|_2^2 dx + \lambda\int\|E\|_0 dx + \eta\int\|\nabla J - \nabla I\|_0 dx\right\},$$

where η is an additional parameter. Using the above algorithm, new edges that do not exist in the input image 200 are penalized, while original edges in the input image 200 are not penalized, and are potentially even boosted in the output image. The $l_0$ minimization problem is generally NP-hard and difficult to solve. By relaxing $l_0$ norms with $l_1$ norms, the dehazing problem becomes:

$$\min_{J,E}\left\{\frac{1}{2}\int\|Jt-(I-E-A+At)\|_2^2 dx + \lambda\int\|E\|_1 dx + \eta\int\|\nabla J - \nabla I\|_1 dx\right\}.$$

Minimizing the energy function with respect to J and E can prevent the image processing system from smoothing very weak edges (controlled by η) during the dehazing processing.

Additionally, by letting Z=J−I, the J sub-problem becomes:

$$\min_{Z}\left\{\frac{1}{2}\int\|(Z+I)t-(I-E-A+At)\|_2^2 dx + \eta\int\|\nabla Z\|dx\right\},$$

which is a total-variation minimization problem and which the image processing system can solve by applying a fast iterative shrinkage-thresholding algorithm. After solving for Z, setting J=Z+I allows for the recovery of J.

The E sub-problem, which has closed-form solution by soft-thresholding, can be represented as:

$$\min_{E}\left\{\frac{1}{2}\int\|Jt-(I-E-A+At)\|_2^2 dx + \lambda\int\|E\|_1 dx\right\}$$

The overall algorithm for haze removal is summarized in Algorithm 2 below.

Algorithm 2: Robust Image Dehazing

Initialization:

$$E^0 = 0, J^0 = \frac{I-A}{t} + A$$

for k=0 to Maxiteration do $$Z_b = I - E^k - A + At - It$$

$$Z = \arg\min_z \{\tfrac{1}{2}\int \|Zt - Z_b\|_2^2 dx + \eta\int \|\nabla Z\|_1 dx\}$$

$$J^{k+1} = I + Z$$

$$E^{k+1} = \text{thresholding}_\lambda(I - J^{k+1}t - (1-t)A)$$

end for

In one or more embodiments, the image processing system applies Algorithm 2 to the input image 200 after generating the refined transmission map 202 to ensure that the radiance gradient of the output image is consistent with the radiance gradient of the input image 200. Specifically, the image processing system can ensure that the radiance of the output image does not include enhanced artifacts that only existed in the input image 200 due to compression edges or other artifacts in the input image 100. For example, the image processing system can verify that a change in radiance between pixels or image patches in the output image is consistent with a change in radiance between pixels in corresponding pixels or image patches in the input image 200.

Providing a consistent radiance gradient between the input image 200 and the output image can ensure that edges that are plainly visible in the input image 200 (e.g., object edges) are plainly visible (or even enhanced) in the output image. Additionally, the image processing system can provide the consistent radiance to ensure that artifacts that are not plainly visible (e.g., edges due to compression or low image quality) do not become plainly visible in the output image after modifying the contrast of the image. Thus, the image processing system can prevent error enhancement in the output image while dehazing the input image 200 and even enhance certain details and features of the input image 200 for a better, clearer picture.

Thus, as described above, Algorithm 1 allows the image processing system to generate an overall high quality transmission map. Visual elements of an input image can break the piecewise smooth assumption of Algorithm 1, however. As a result, the refined transmission map may be oversmoothed in some regions. Algorithm 2 allows the image processing system to dehaze the input image while correcting the oversmoothing errors of Algorithm 1 and also reducing or eliminating the error produced during the dehazing processing, producing a near artifact-free output image. FIG. 2D illustrates an output image 206 based on the transmission map of FIG. 2B and without the unamplified artifact layer associated with the amplified artifact layer 104 of FIG. 2C. As shown by a comparison of FIG. 2A and FIG. 2D, the output image 206 is dehazed and lacks significant or all artifact amplification.

FIGS. 3A-3E illustrate experimental results of a haze removal process for a synthetic image. Specifically, FIGS. 3A-3E illustrate the haze removal process for an input image of a number of cones and other elements with a known ground truth haze-free image. Specifically, FIG. 3A illustrates the synthetic input image 300 with hazy atmosphere. FIG. 3B illustrates the ground truth haze-free image 302 for the input image 300 of FIG. 3A. By adding a synthetic haze to the ground truth image 302, the image processing system can store exact haze information for comparing to the results of the haze removal process. According to one embodiment, the image processing system applies Algorithm 1 and Algorithm 2 to the input image of FIG. 3A to obtain an output image, as described below.

The image processing system first obtains a coarse transmission map from the input image 300. Because the coarse transmission map includes texture information and other information that could result in inaccurate haze removal, the image processing system generates a refined transmission map 304 using Algorithm 1, as illustrated in FIG. 3C. The refined transmission map removes at least some of the transmission information associated with different colors and textures in the input image. A comparison with the ground truth transmission map 306 illustrated in FIG. 3D indicates that, while the refined transmission map 304 may not generate a perfect result, the refined transmission map 304 approximates the depth of the surfaces and objects in the input image 300 better than the coarse transmission map.

After obtaining the refined transmission map 304 the image processing system can use Algorithm 2 to dehaze the image and produce an output image. FIG. 3E illustrates the output image 308 based on the refined transmission map 304 of FIG. 3C. As illustrated, the image processing system produces a result that is similar to the ground truth image 302. Additionally, the image processing system produces a result with less mean squared error than other conventional methods and does not require training to produce the result.

According to one embodiment, the image processing system uses the physical haze model to dehaze an image. Specifically, a series of experiments using the dehazing method described above and conventional dehazing methods produce results illustrated in FIGS. 4A-4E and FIGS. 5A-5F. FIGS. 4A-4E illustrate a cityscape scene with a sky background for a dehazing process using the dehazing method described above, in addition to results from a plurality of conventional dehazing methods.

The experiments included processing the image via the various methods on a laptop computer with an i7-4800 CPU and 16 GB of RAM. In one or more embodiments, the dehazing method described herein uses an adaptive image patch size ($\Omega(x)$) based on the resolution of the input image. For example, the image patch can be 15×15 for 256×256 images and 30×30 for 512×512 images. Alternatively, the image processing system can use any size of image patches for estimating the haze values for the image. Furthermore, the method maintains a small amount of haze for distant objects and a lower bound $t_0$ for the transmission. The experiments use default parameters for the conventional dehazing methods.

The experiments also select tensor parameters to be $\beta=9$ and $\gamma=0.85$, and the regularization parameters are $\alpha_0=0.5$, $\alpha_0=0.5$, $\lambda=0.5$, and $\eta=0.5$ for all experiments, though these parameters have little effect on the dehazing method of the present disclosure. Furthermore, the experiment for the dehazing method of the present disclosure terminates Algorithm 1 after 300 iterations and Algorithm 2 after 200 iterations. Such numbers of iterations may be sufficient to produce good results, though the image processing system may apply other iterations of each algorithm as may serve a particular embodiment. Additionally, the experiment for the current dehazing method does not solve the J sub-problem exactly, but limits the sub-problem to a fixed number of iterations to reduce computational cost.

Additionally, the experiment for the current method estimates atmospheric light for videos using the atmospheric light from the first frames for the remaining frames of the videos to obtain consistent frames. In one or more embodiments, the image processing system can use the atmospheric light or other characteristics from a first subset of video frames to use in connection with a second subset of video frames in a video to obtain consistent results from dehazing or otherwise modifying the contrast in the video. The estimated overall speed is 24 seconds for a 480×270 frame using a MATLAB implementation, which is significantly faster than other conventional dehazing methods. The image processing system can also increase the overall exposure of some results for better presentation.

Figure 4E:
Figure 4D:
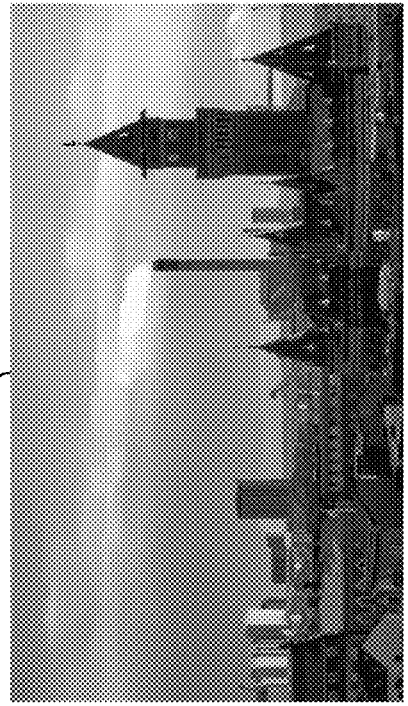

FIG. 4A illustrates an input image 400 of the cityscape scene with hazy contrast and lighting. FIGS. 4B-4D illustrate output images 402-406 using various conventional dehazing methods. Specifically, FIG. 4B illustrates an output image 402 from a conventional dehazing method that uses a physical haze model and is based on transmission estimation. FIG. 4C illustrates an output image 404 from a conventional dehazing method that is not based on a physical haze model and is based on adaptive contrast enhancement. The output images 402, 404 in FIGS. 4B and 4C include many blocky artifacts after dehazing the input image 400 due to compression or the low quality of the input image 400. Additionally, the output image 404 of FIG. 4C includes color distortion due to enhancing the image contrast.

FIG. 4D illustrates an output image 406 from a conventional dehazing method that is designed for JPEG blocky artifact suppression. As illustrated, the resulting output image 406 produces a smooth result without artifacts. Although the output image 406 of FIG. 4D includes no visible blocky artifacts, the conventional dehazing method tends to produce oversmoothed results in regions of the image (e.g., the clouds in the sky). In contrast, the output image 408 using the dehazing method of the present disclosure, illustrated in FIG. 4E, includes few or no blocky artifacts while also preserving the texture and color details in the sky and on the structures.

FIG. 5A illustrates a zoomed region around the tower of the input image 500 of FIG. 4A. FIGS. 5B-5D illustrate a plurality of output images 502-506 for the zoomed region of FIG. 5A. As illustrated, the output images include easily visible aliasing artifacts around the edges of the tower for each of the conventional methods, in addition to inflated flags at the top of the tower. FIG. 5E illustrates an output image 508 for the zoomed region using the current dehazing method described herein. The output image 508 of FIG. 5E does not have the same aliasing artifacts or issues with the flag that the results from the conventional methods exhibit.

As illustrated, the image processing system is able to produce results that provide significant benefits over the conventional methods. Specifically, the image processing system is able to preserve sharp edges at depth discontinuities while producing smooth transmission within each surface or object. Additionally, the image processing system can perform dehazing and error correction to suppress several different types of artifacts and noise (e.g., blocky artifacts due to compression or image quality, aliasing artifacts). The image processing system is able to obtain high quality images with reduced haze without amplifying (or reducing the amplification of) artifacts and while also maintaining the vividness of image structures. In one or more embodiments, the image processing system can also reduce artifacts from the input image to the output image.

FIG. 5F illustrates an amplified artifact layer 510 for the zoomed region of the input image of FIG. 5A. As illustrated, the artifact layer includes visible artifacts at the edges of the tower. Because the image processing system is able to identify the artifacts at the edges of the tower due to aliasing, the image processing system is able to suppress the artifacts in the output image. The image processing system takes the artifact layer into account when dehazing the input image so that the output image does not enhance the artifacts in the artifact layer when modifying the contrast of the input image.

The experiments illustrate that the image processing system provides improvements over conventional techniques in dehazing and modifying contrast in an image. The image processing system is especially efficient at producing a high quality dehazing result from a low quality image. For example, the image processing system is able to dehaze a low quality image without enhancing edges and other artifacts due to image compression, image quality, and aliasing at object boundaries. The conventional techniques, however, struggle to produce a high quality dehazing result from low quality image. Specifically, the conventional techniques produce visible blocky artifacts, color strip artifacts in regions with color gradients (e.g., the sky), oversmoothed regions, moderate to severe color shifting, and/or aliasing artifacts and halos that are much more noticeable for the same images than the image processing system described herein.

Additionally, the image processing system is able to provide improvements over the conventional techniques when dehazing a video. For example, many of the conventional techniques require every frame in video to estimate the depth of the scene and to reduce haze in the video. The image processing system, however, is able to estimate the depth of the scene and reduce the haze throughout the video without requiring every video frame from the video. In particular, the image processing system can estimate the depth based on a single video frame or based on a small subset of video frames from the video.

Figure 6:
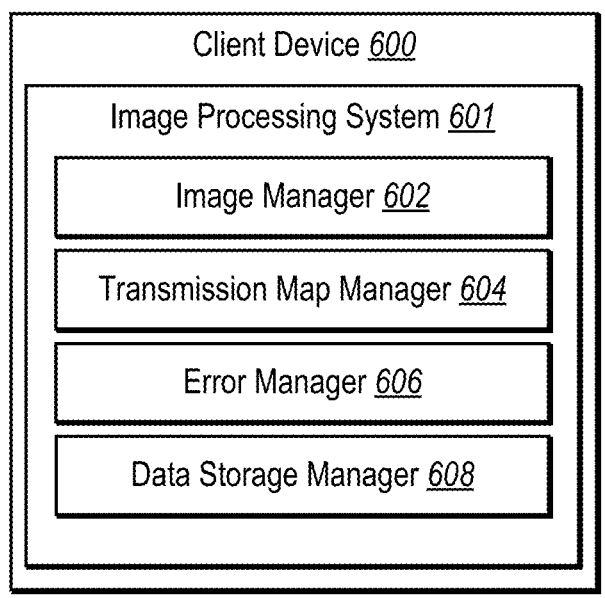
FIG. 6 illustrates a schematic diagram of an embodiment of client device including an image processing system in accordance with one or more embodiments.

As described above, an image processing system can dehaze an image with reduced artifact enhancement. FIG. 6 illustrates a schematic diagram of a client device 600 including an image processing system 601 for performing the dehazing method described herein. The image processing system 601 can include, but is not limited to an image manager 602, a transmission map manager 604, an error manager 606, and a data storage manager 608. Although the image processing system 601 of FIG. 6 is depicted as having various components, the image processing system 601 may have any number of additional or alternative components. For example, the image processing system 601 can include components for managing user inputs or for managing output (e.g., to a display device).

In one or more embodiments, each of the components and subcomponents of the image processing system 601 can be in communication with one another using any suitable communication technologies. It will be recognized that although the subcomponents of the image processing system 601 are shown to be separate in FIG. 6, any of the subcomponents may be combined into fewer components, such as into a single component, or divided into more components as may serve a particular implementation. Furthermore, although the components of FIG. 6 are described in connection with the image processing system 601, at least some of the components for performing operations in conjunction with the image processing system 601 described herein may be implemented on other devices.

The components of the image processing system 601 can include software, hardware, or both. For example, the components of the image processing system 600 (e.g., the image manager 602, the transmission map manager 604, the error manager 606, or the data storage manager 608, or devices in communication with the components) can include one or more instructions stored on a computer-readable storage medium and executable by processors of one or more computing devices, such as the client device 600. When executed by the one or more processors, the computer-executable instructions of the image processing system 601 can cause the computing device(s) to perform the depth correction processes described herein. Alternatively, the components of the image processing system 601 can comprise hardware, such as a special purpose processing device to perform a certain function or group of functions. Additionally or alternatively, the components of the image processing system 601 can comprise a combination of computer-executable instructions and hardware.

Furthermore, the components of the image processing system 601 performing the functions described herein with respect to the image processing system 601 may, for example, be implemented as part of a stand-alone application, as a module of an application, as a plug-in for applications including image processing applications, as a library function or functions that may be called by other applications, and/or as a cloud-computing model. Thus, the components of the image processing system 601 may be implemented as part of a stand-alone application on a personal computing device or a mobile device. Alternatively or additionally, the components of the image processing system 601 may be implemented in any application that allows delivery of content to users, including, but not limited to, applications in ADOBE CREATIVE CLOUD, such as ADOBE PHOTOSHOP. "ADOBE", "CREATIVE CLOUD", and "PHOTOSHOP" are registered trademarks of Adobe Systems Incorporated in the United States and/or other countries.

As previously described, the image processing system 601 can include an image manager 602. Specifically, the image manager 602 facilitates input and analysis of images for dehazing. For example the image manager 602 can receive a specific image as an input and analyze the image for characteristics of the image. To illustrate, the image manager 602 can analyze the image for lightness, color, contrast, transmission or other values that allow the image processing system to perform a dehazing process on the image. The image manager 602 can additionally, or alternatively, provide data that allows the image processing system or another system to perform other post processing operations on the image.

In one or more embodiments, the transmission map manager 604 facilitates generation of transmission maps for the image. In particular, the transmission map manager 604 generates a coarse transmission map for the image by identifying one or more transmission maps for the image. For example, the transmission map manager 604 first generates a coarse transmission map that estimates the transmission for the input image.

The transmission map manager 604 then generates a refined transmission map from the coarse transmission map. For example, the transmission map manager 604 can generate the refined transmission map to include transmission information that corresponds to a depth of surfaces and objects in the input image. To illustrate, the transmission map manager 604 generates the refined transmission map to estimate the depth of surfaces and objects in the input image by excluding texture information in the coarse transmission map. For instance, the transmission map manager 604 refines the coarse transmission map to create smooth transmission values for surfaces within object boundaries, at the same depth, regardless of colors or surface textures.

One or more embodiments of the image processing system 601 include the error manager 606 to facilitate the identification of artifacts in the image and suppression of errors while dehazing the image. Specifically, the image processing system 601 identifies artifacts due to compression or quality issues in the image. For example, the image processing system 601 identifies an artifact layer or artifact layer that includes artifacts that the system suppresses when modifying the contrast of the image.

In one or more implementations, the error manager 606 can generate the artifact layer to present on a display device in response to a request for the artifact layer. The error manager 606 may allow a user to make manual adjustments to the artifact layer. For example, the error manager 606 receives input from a user to modify one or more regions of the artifact layer. Alternatively, the error manager 606 identifies the artifact layer and suppresses the identified artifacts in the output image without displaying the artifact layer to the user.

The image processing system can include a data storage manager 608 to manage data that the other components in the image processing system 601 use and/or produce. Specifically, the data storage manager 608 can communicate with the other components in the image processing system (i.e., the image manager 602, the transmission map manager 604, and the error manager 606) to obtain data that the components have produced for storage and/or use by one or more of the components. To illustrate, the data storage manager 608 can store data that includes, but is not limited to, an input image, a coarse transmission map, a refined transmission map, an artifact layer, and an output image.

In one or more embodiments, the data storage manager 608 can communicate with the image manager 602 to obtain the input image and analytics data associated with the input image. The data storage manager 608 can also communicate with the transmission map manager 604 to provide the input image and analytics data to the transmission map manager 604. Additionally, the data storage manager 608 can communicate with the error manager 606 to provide the input image, analytics data, and transmission information to the error manager 606. The data storage manager 608 can store any or all of the information the various components of the image processing system 601 generate for use by any of the other components.

FIGS. 1A-6 describe that the image processing system can perform dehazing post processing on an image. In one or more embodiments, the image processing system can also perform additional or alternative enhancement post processing on an image using Algorithm 1 and/or Algorithm 2 described above. For example, the image processing system can perform other types of contrast enhancement operations on the image. To illustrate, if the image processing system is performing a contrast enhancement operation on the image (e.g., to modify contrast due to any lighting/contrast issues in an image), the image processing system can use the algorithms described in connection with the current dehazing method to suppress artifact enhancement.

FIGS. 1A-6, the corresponding text, and the examples, provide a number of different systems and devices for dehazing images with increased accuracy. In addition to the foregoing, embodiments can be described in terms of flowcharts comprising acts and steps in a method for accomplishing a particular result. For example, FIGS. 7 and 8 illustrate flowcharts of exemplary methods in accordance with one or more embodiments.

Figure 7:
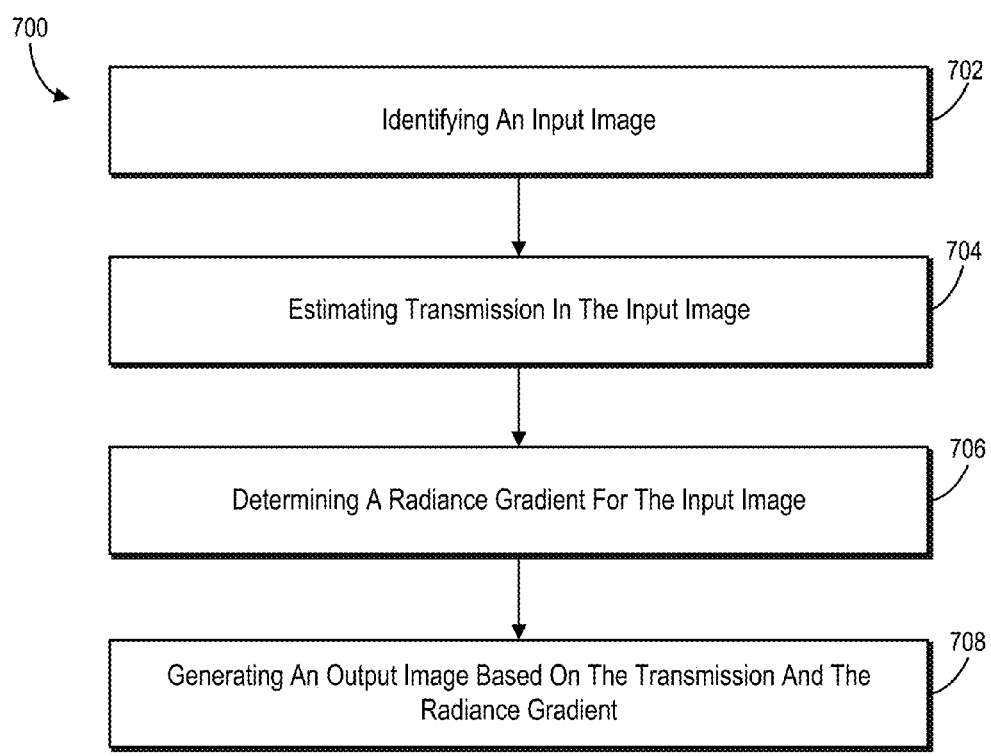
FIG. 7 illustrates a flowchart of a series of acts in a method of reducing error enhancement during image contrast modification in accordance with one or more embodiments.
Figure 8:
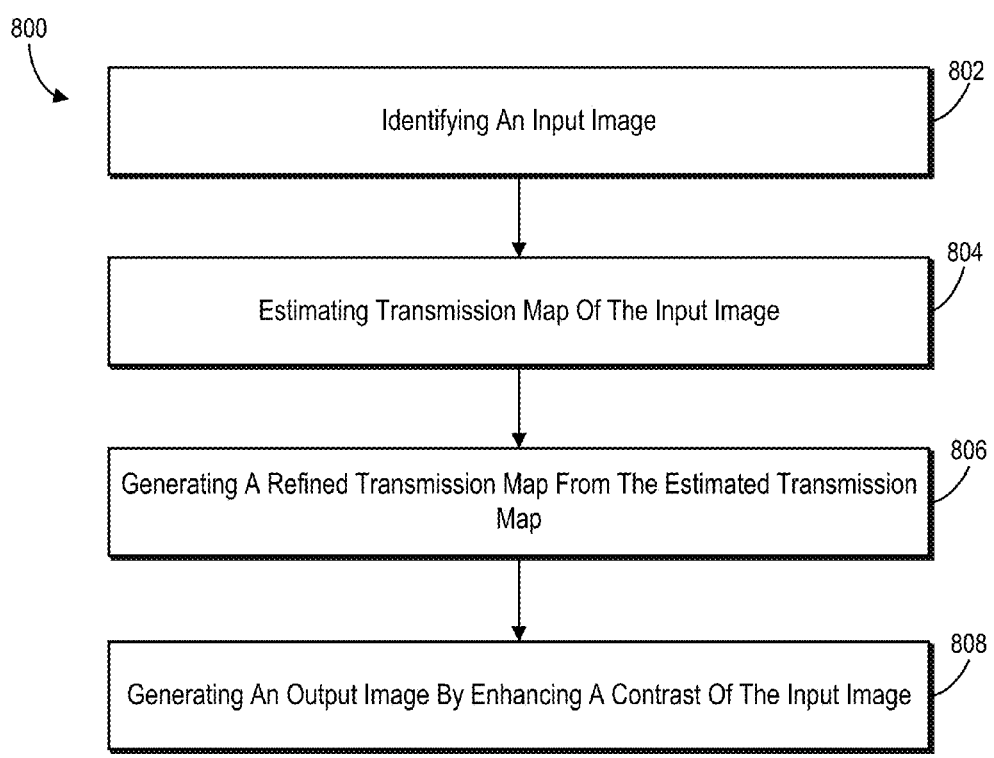
FIG. 8 illustrates a flowchart of a series of acts in another method of reducing error enhancement during image contrast modification in accordance with one or more embodiments.

FIG. 7 illustrates a flowchart of a series of acts in a method 700 of reducing error enhancement while dehazing an image. The method 700 includes an act 702 of identifying an input image 100, 200, 300, 400, 500. For example, act 702 can involve receiving an image comprising a low-resolution image with image artifacts due to compression of the image. To illustrate, the input image 100, 200, 300, 400, 500 can include a compressed frame of a video.

As part of act 702, or as a separate act, the method 700 can include identifying a plurality of compressed frames of a video and dehazing the plurality of compressed video frames individually. Additionally, the method 700 can include identifying characteristics of a first subset of frames from the plurality of compressed video frames and applying the identified characteristics to a second subset of frames from the plurality of compressed video frames to dehaze the plurality of compressed video frames. For example, the identified characteristics can include an atmospheric light of the first subset of frames.

The method 700 also includes an act 704 of estimating transmission in the input image 100, 200, 300, 400, 500. For example, act 704 involves estimating an amount of unscattered light reflected from objects in the input image 100, 200, 300, 400, 500. To illustrate, act 704 can involve generating a refined transmission map 102, 202, 304 comprising transmission information for the input image 100, 200, 300, 400, 500. The refined transmission map 102, 202, 304 can include transmission information that is consistent with a depth of objects in the input image 100, 200, 300, 400, 500. For example, act 704 can involve smoothing texture information in a coarse transmission map to obtain the refined transmission map 102, 202, 304.

The method 700 further includes an act 706 of determining a radiance gradient for the input image 100, 200, 300, 400, 500. For example, act 706 can involve determining radiance differences between adjacent regions of the input image 100, 200, 300, 400, 500. To illustrate, act 706 can involve determining radiance differences between a plurality of image patches in the input image 100, 200, 300, 400, 500. Additionally, act 706 can involve adaptively selecting a size of each image patch from the plurality of image patches based on a resolution of the input image 100, 200, 300, 400, 500.

Additionally, the method 700 includes an act 708 of generating an output image 106, 206, 308, 408, 508 based on the transmission and the radiance gradient. For example, act 708 involves removing haze from the input image 100, 200, 300, 400, 500 based on the estimated amount of unscattered light. To illustrate, act 708 can involve removing the haze from the input image 100, 200, 300, 400, 500 based on transmission information in the refined transmission map 102, 202, 304.

Act 708 also involves preventing error enhancement in the output image 106, 206, 308, 408, 508 based on the determined radiance gradient. For example, act 708 can involve constraining edges in the output image 106, 206, 308, 408, 508 to be consistent with edges in the input image 100, 200, 300, 400, 500. Act 708 can involve identifying an artifact layer 204, 510 that includes artifacts from the input image 100, 200, 300, 400, 500 and suppressing the artifact layer 204, 510 in the output image 106, 206, 308, 408, 508. Act 708 can also involve identifying artifact edges due to compression of the input image 100, 200, 300, 400, 500. Additionally, or alternatively, act 708 can involve identifying edges in the input image 100, 200, 300, 400, 500 based on radiance values of adjacent regions in the input image 100, 200, 300, 400, 500.

In one or more embodiments, act 708 can involve identifying edges in the input image 100, 200, 300, 400, 500 that do not meet a gradient threshold, and penalizing the identified edges in the output image 106, 206, 308, 408, 508. Additionally, or alternatively, act 708 can involve identifying edges in the input image 100, 200, 300, 400, 500 that meet a gradient threshold, and enhancing the identified edges in the output image. Alternatively, act 708 can involve identifying edges in the input image 100, 200, 300, 400, 500 that meet a gradient threshold, and maintaining radiance gradients associated with the identified edges in the output image 106, 206, 308, 408, 508.

FIG. 8 illustrates a flowchart of a series of acts in a method 800 of reducing error enhancement while enhancing an image contrast. The method 800 includes an act 802 of identifying an input image 100, 200, 300, 400, 500. For example, act 802 can involve receiving an image comprising a low-resolution image with image artifacts due to compression of the input image 100, 200, 300, 400, 500. To illustrate, the input image 100, 200, 300, 400, 500 can include a compressed frame of a video.

As part of act 802, or as a separate act, the method 800 can include identifying a plurality of compressed frames of a video and dehazing the plurality of compressed video frames individually. Additionally, the method 800 can include identifying characteristics of a first subset of frames from the plurality of compressed video frames and applying the identified characteristics to a second subset of frames from the plurality of compressed video frames to dehaze the plurality of compressed video frames. For example, the identified characteristics can include an atmospheric light of the first subset of frames.

The method 800 also includes an act 804 of estimating a transmission map of the input image 100, 200, 300, 400, 500. For example, act 804 involves estimating a transmission map of the input image 100, 200, 300, 400, 500, the transmission map representing an amount of reflected, unscattered light from a scene of the input image 100, 200, 300, 400, 500. Act 804 can involve estimating a coarse transmission map from a dark channel prior of the input image. The coarse transmission map can include texture information corresponding to surfaces and objects in the input image 100, 200, 300, 400, 500.

The method 800 includes an act 806 of generating a refined transmission map 102, 202, 304 from the estimated transmission map. For example, act 806 involves generating a refined transmission map 102, 202, 304 from the estimated transmission map, the refined transmission map 102, 202, 304 comprising transmission information consistent with a depth of objects in the scene of the input image 100, 200, 300, 400, 500. Act 806 involves applying a depth edge-aware algorithm to the coarse transmission map. For example, act 806 can involve applying a total generalized variation algorithm with a guided image to the coarse transmission map.

Additionally, act 806 can involve smoothing the coarse transmission map by removing texture information from the coarse transmission map. For example, act 806 can involve smoothing transitions between pixels within object boundaries of the coarse transmission map. For instance, act 806 can involve smoothing transitions between pixels within object boundaries produces smooth transmission information within the object boundaries.

The method 800 further includes an act 808 of generating an output image 106, 206, 308, 408, 508 by enhancing a contrast of the input image 100, 200, 300, 400, 500. For example, act 808 involves generating an output image 106, 206, 308, 408, 508 by enhancing a contrast of the input image 100, 200, 300, 400, 500 based on the refined transmission map 102, 202, 304 while preventing error enhancement in the output image 106, 206, 308, 408, 508. To illustrate, act 808 can involve enhancing a contrast of objects from the input image 100, 200, 300, 400, 500 and preventing enhancement of compression artifacts from the input image 100, 200, 300, 400, 500. For example, act 808 can involve enhancing the contrast of the input image 100, 200, 300, 400, 500 to reduce an amount of haze in the generated output image 106, 206, 308, 408, 508.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Along related lines, the term "digital medium environment," as used herein, generally refers to an environment that is implemented, for example, as a stand-alone application (e.g., a personal computer or mobile application running on a computing device), as a module of an application, as a plug-in for applications, as a library function or functions that may be called by other applications such as web design applications, and/or as a cloud-computing system. A digital medium environment allows users to create, edit, and/or modify electronic data, such as digital images or videos.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
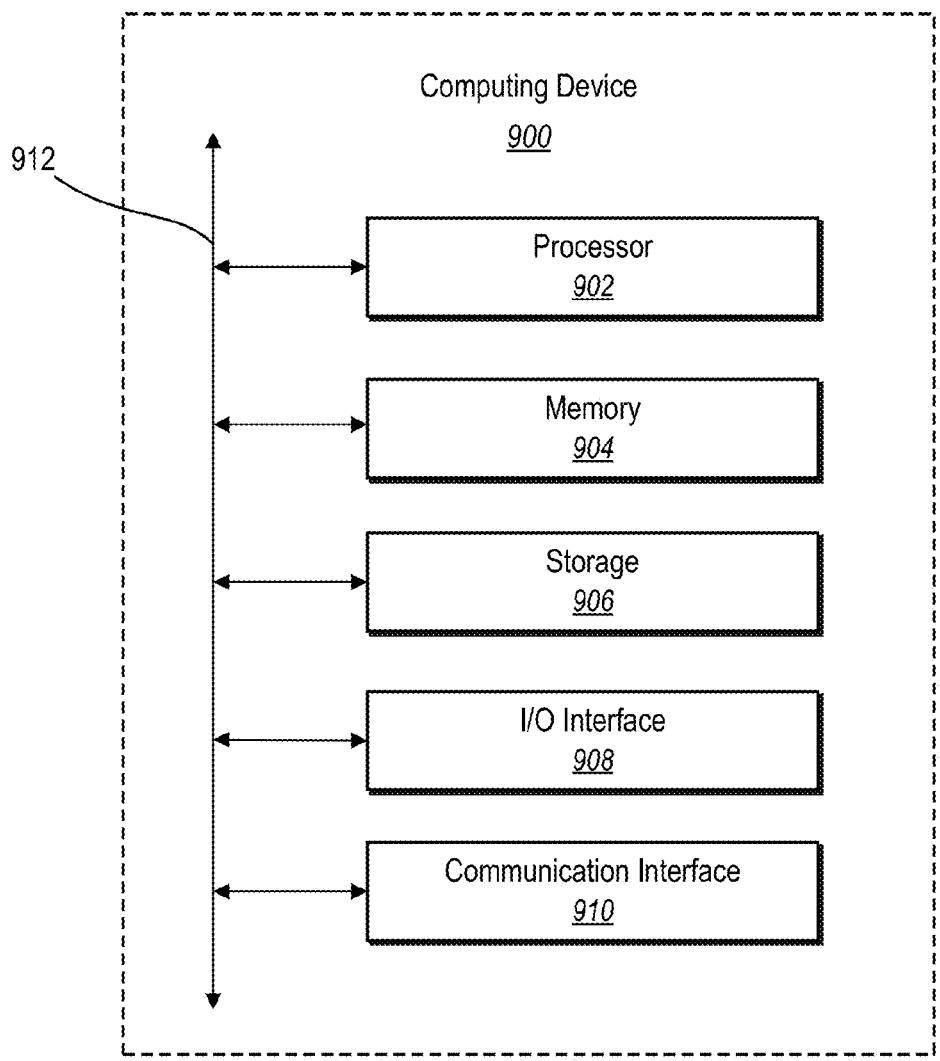
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the image processing system 601. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for enhancing or otherwise editing digital images, a method of reducing error enhancement while dehazing an image, comprising:
    identifying, by at least one processor, an input image;
    estimating, by the at least one processor, an amount of unscattered light reflected from objects in the input image;
    determining, by the at least one processor, a radiance gradient for the input image; and
    generating, by the at least one processor, an output image, wherein generating comprises:
    removing haze from the input image based on the estimated amount of unscattered light; and
    preventing error enhancement in the output image based on the determined radiance gradient.

2. The method as recited in claim 1, wherein preventing error enhancement in the output image based on the determined radiance gradient comprises constraining edges in the output image to be consistent with edges in the input image.

3. The method as recited in claim 2, wherein constraining edges in the input image to be consistent with edges in the output image comprises:
    identifying an artifact layer comprising artifacts from the input image; and
    suppressing the artifact layer in the output image.

4. The method as recited in claim 3, wherein identifying an artifact layer comprising artifacts from the input image comprises identifying artifact edges due to compression of the input image.

5. The method as recited in claim 2, further comprising identifying edges in the input image based on radiance values of adjacent regions in the input image.

6. The method as recited in claim 2, wherein constraining edges in the input image to be consistent with edges in the output image comprises:
    identifying edges in the input image that do not meet a gradient threshold; and
    penalizing the identified edges in the output image.

7. The method as recited in claim 2, wherein constraining edges in the input image to be consistent with edges in the output image comprises:
    identifying edges in the input image that meet a gradient threshold; and
    enhancing the identified edges in the output image.

8. The method as recited in claim 1, wherein determining a radiance gradient for the input image comprises determining radiance differences between a plurality of image patches in the input image.

9. The method as recited in claim 8, further comprising adaptively selecting a size of each image patch from the plurality of image patches based on a resolution of the input image.

10. In a digital medium environment for enhancing or otherwise editing digital images, a method of reducing error enhancement while enhancing an image contrast, comprising:
    identifying, by at least one processor, an input image;
    estimating, by the at least one processor, a transmission map of the input image, the transmission map representing an amount of reflected, unscattered light from a scene of the input image;
    generating, by the at least one processor, a refined transmission map from the estimated transmission map, the refined transmission map including transmission information consistent with a depth of objects in the scene of the input image;
    determining, by the at least one processor, a radiance gradient for the input image; and
    generating, by the at least one processor, an output image by enhancing a contrast of the input image based on the refined transmission map and preventing error enhancement in the output image based on the determined radiance gradient.

11. The method as recited in claim 10, wherein estimating the transmission map of the input image comprises estimating a coarse transmission map from a dark channel prior of the input image.

12. The method as recited in claim 11, wherein generating the refined transmission map from the estimated transmission map comprises applying a depth edge-aware algorithm to the coarse transmission map.

13. The method as recited in claim 12, wherein applying the depth edge-aware algorithm to the coarse transmission map comprises identifying boundaries of an object while ignoring edges within the object, the edges within the object associated with differences of color or texture of the object.

14. The method as recited in claim 10, wherein generating the refined transmission map from the estimated transmission map comprises smoothing the coarse transmission map by removing texture information from the coarse transmission map.

15. The method as recited in claim 14, wherein smoothing the coarse transmission map by removing texture information from the coarse transmission map comprises smoothing transitions between pixels within object boundaries of the coarse transmission map.

16. A system for reducing error enhancement while dehazing images, comprising:

at least one processor; and at least one non-transitory computer-readable storage medium storing instructions thereon that, when executed by the at least one processor, cause the system to:

identify an input image;

estimate a transmission map of the input image, the transmission map representing an amount of reflected, unscattered light from a scene of the input image;

generate a refined transmission map from the estimated transmission map, the refined transmission map including transmission information consistent with a depth of objects in the scene of the input image;

determine a radiance gradient for the input image; and generate an output image, wherein generating comprises:

removing haze from the input image based on the estimated amount of unscattered light; and preventing error enhancement in the output image based on the determined radiance gradient.

17. The system as recited in claim 16, further comprising instructions that, when executed by the at least one processor, cause the system to prevent error enhancement in the output image based on the determined radiance gradient, wherein preventing comprises:

identifying an artifact layer comprising artifacts from the input image; and suppressing the artifact layer in the output image to constrain edges in the output image to be consistent with edges in the input image.

18. The system as recited in claim 16, further comprising instructions that, when executed by the at least one processor, cause the system to:

compare edges in the input image to a threshold;

suppress edges that are below the radiance threshold in the output image; and boost edges that are above the radiance threshold in the output image.

19. The system as recited in claim 16, further comprising instructions that, when executed by the at least one processor, cause the system to generate the refined transmission map from the estimated transmission map, wherein generating comprises applying a depth edge-aware algorithm to estimated transmission map.

20. The system as recited in claim 19, further comprising instructions that, when executed by the at least one processor, cause the system to generate the refined transmission map from the estimated transmission map, wherein generating comprises smoothing the coarse transmission map to remove texture information from the coarse transmission map.

* * * * *